Aug. 16, 1927.

S. H. PERRON

1,639,105

REPRODUCING PIANO

Filed July 12, 1921

S. H. PERRON

1,639,105

REPRODUCING PIANO

Filed July 12, 1921

S. H. PERRON 1,639,105

REPRODUCING PIANO

Filed July 12, 1921

Inventor,
Samuel H. Perron
by
T. T. Greenwood
atty

Patented Aug. 16, 1927.

1,639,105

UNITED STATES PATENT OFFICE.

SAMUEL H. PERRON, OF MENDON, MASSACHUSETTS, ASSIGNOR TO ALEXANDER STEINERT, OF BOSTON, MASSACHUSETTS.

REPRODUCING PIANO.

Application filed July 12, 1921. Serial No. 484,257.

This invention relates to an automatic musical instrument of the type wherein a perforated note sheet or its equivalent is employed to govern the playing of the instrument, and has particular reference to pianos which are now known as "reproducing" pianos. A reproducing piano is one having the capacity of automatically and faithfully reproducing all of the characteristic shadings of the artistic performance of a skilled pianist. This is rendered possible because the reproducing piano is equipped with expression mechanism which enables varying dynamic or intensity effects to be produced from pianissimo to fortissimo and also with mechanism producing the loud and soft pedal effects. The note sheet for such a reproducing piano (in addition to having the necessary note perforations for sounding the piano strings) has numerous expression holes which control the various expression devices. Also, the note sheet is commonly equipped with a control hole to automatically bring into action the rewinding or re-roll mechanism after a composition has been played. The reproducing piano thus differs from the ordinary automatic piano player or player piano (controlled commonly by a note sheet with 88 perforations for controlling the 88 notes of an ordinary piano) in that it has these numerous additional expression devices governed by corresponding additional holes in the note sheet so as to reproduce the artistic renderings of a virtuoso.

A reproducing piano is usually, though not necessarily actuated or governed by pneumatic means and has a tracker formed with openings corresponding to the notes of the piano and which are adapted to register with perforations in the note sheet as it travels over the tracker for the playing of the notes. In addition to the note openings, the tracker has numerous other openings adapted to register with corresponding additional perforations in the note sheet by which to govern the expression of the notes played by the piano and to effect other operations such as the re-roll of the note sheet after the composition has been finished. Different makes of reproducing pianos have different arrangements of the expression and control devices so that correspondingly located holes in the tracker of different makes do not govern the same expression and control devices. Accordingly, a note sheet prepared for use on a reproducing piano of a particular make will not play successfully on a different piano.

The purchaser of a particular make of piano, therefore, is limited in his selection of music to the library of note sheets furnished for his piano; and, he cannot satisfactorily use a note sheet of another manufacturer which is perforated in accordance with a different system.

The primary object of the present invention is to provide a reproducing piano with means by which it may be conditioned to play successfully a plurality of different note sheets which are perforated for expression and control in accordance with different systems. The improved means are of such character that they may be conveniently applied to existing reproducing pianos.

In accordance with the present invention, the reproducing piano is provided with manually-operable means by which the piano may be adjusted to play different kinds of note sheets so that it may be set in one position to play one kind of note sheet, in a second position to play a second kind of note sheet, in a third position to play a third kind of note sheet, etc.

The tracker of the improved piano has as many expression and control holes of sufficient number and appropriate location to correspond and register with the expression and control perforations of all the different kinds of note sheets which can be played on the piano, and all of these holes which are not utilized in connection with any particular note sheet selected for playing are rendered ineffective and idle for the time being.

An improved construction and arrangement of expression and control apparatus is provided so as to enable the different kinds of note sheets to be successfully employed.

The present improvements are illustrated in the accompanying drawings, wherein—

Fig. 7ª is a longitudinal section through a part of one of the selector valve boxes. Fig. 9ª is a detailed view illustrating the arrangement of ducts in the slide valve shown in Fig. 9.

The pianos on which the several note sheets are used have pneumatic actions in their self-playing departments, and in each instance the air in the various wind chests is under a partial vacuum produced by an air pump. Accordingly, in the illustrated embodiment of the present universal system the air is maintained under a partial vacuum by the air pump 200 indicated in Figs. 1, 2 and 3.

In all of the instruments using the three designated note sheets, the expression is in part controlled by varying the degree of suction in the wind chests which supply motive power to the striking pneumatics through which the hammers of the piano action are propelled against the piano strings, there being in each case separate wind chests for the bass and treble sections of the piano. The greater the degree of vacuum or suction in the wind chests the more forcible will be the blow of the hammers, and as the degree of suction is lessened the power of the hammer blow is correspondingly decreased. Each of these three pianos is provided with dynamic or intensity expression devices which enable several different degrees of suction to be automatically produced in the wind chests.

Also, in all three of these pianos expression holes in the note sheet and in the tracker automatically control the mechanism which is governed by the loud and soft pedals of the piano so as to sustain the vibration of the struck strings, or to soften the tone.

Also, in all three of these pianos there is an aperture in the tracker controlled by a corresponding aperture in the note sheet which results in the automatic rewinding or re-rolling of the note sheet after the composition thereof has been completed.

Two of these pianos, using the A and B sheets respectively, also have apertures in the tracker controlled by corresponding apertures in the note sheet by which the theme notes are accented in both the bass and treble sections of the piano.

The third piano is characterized by two features which are not employed in the other two pianos. The piano using the C sheet has a crescendo device which can act quickly or slowly, depending upon which one of two holes in the tracker is uncovered by apertures in the note sheet. Also, this piano is further characterized by certain so-called "lock and cancel" valves governed by special holes in the tracker at both the bass and treble ends by means of which, when any tracker hole is uncovered which governs one of the intensity pneumatic valves the corresponding lock and cancel valve will be opened and will remain open until closed by the action of another hole in the note sheet uncovering a corresponding hole in the tracker.

All of these features and characteristics of the three pianos mentioned are now well known in the art. Each of these pianos has a special arrangement of tracker holes for producing the foregoing result which differs from that of either of the other two pianos.

Accordingly, it is apparent that no one of the stated note sheets can be successfully used on any piano except the one for which it is specially prepared.

In accordance with the present invention a universal reproducing piano is presented upon which all three of the specified note sheets can be successfully played.

The improved universal reproducing piano has a novel universal tracker capable of cooperating with all three of the specified note sheets; a selector which is adjustable to cooperate in turn with any one of the three note sheets; and cooperating expression and control devices so organized as to cooperate with the several note sheets in turn.

The several features of the improved piano will be described under appropriate headings.

Figure 4:
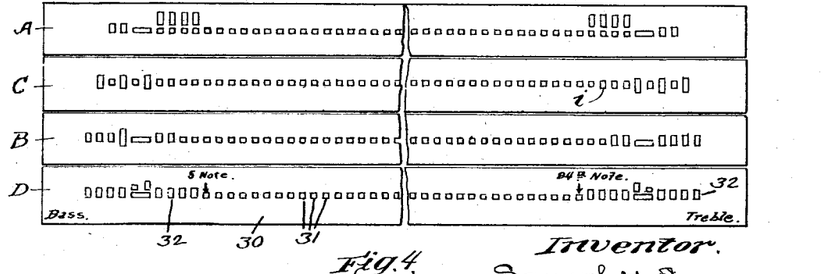
Fig. 4 is a diagram illustrating the positions of the expression and control holes in trackers heretofore used in connection with the three note sheets respectively and in the improved universal tracker used in connection with all of said sheets.
Figure 5:
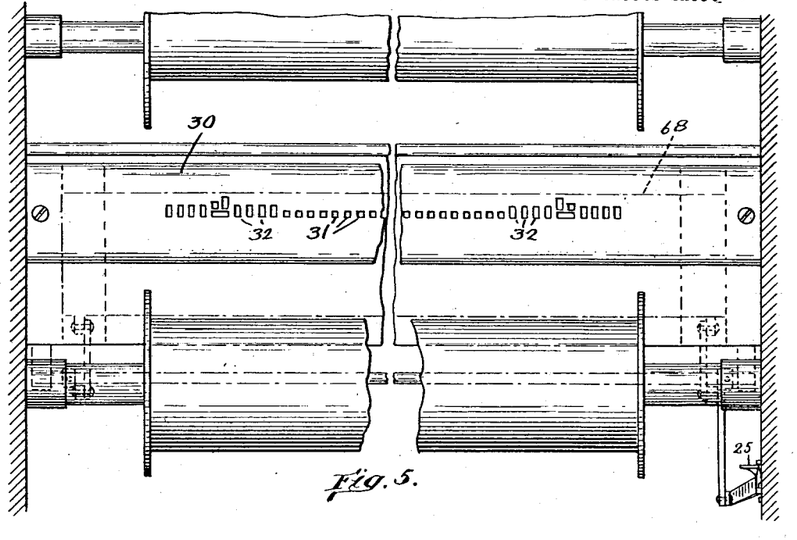
Fig. 5 is a front view partly broken away of the spool box of the piano.

*Tracker.*—As shown in Fig. 4, the improved universal tracker D, has note holes 31, adapted to register with the apertures in the note sheet which control the striking pneumatics and at each end it has a group of additional expression and control holes 32. Fig. 4 also shows at A, B and C, trackers for the A, B and C note sheets respectively, and it will be noted that the three differ from each other so far as the expression and control holes are concerned. It will also be noted that the universal tracker D, has expression and control holes corresponding in number and location with all the expression and control holes of the three trackers of the indicated pianos.

Figure 1:
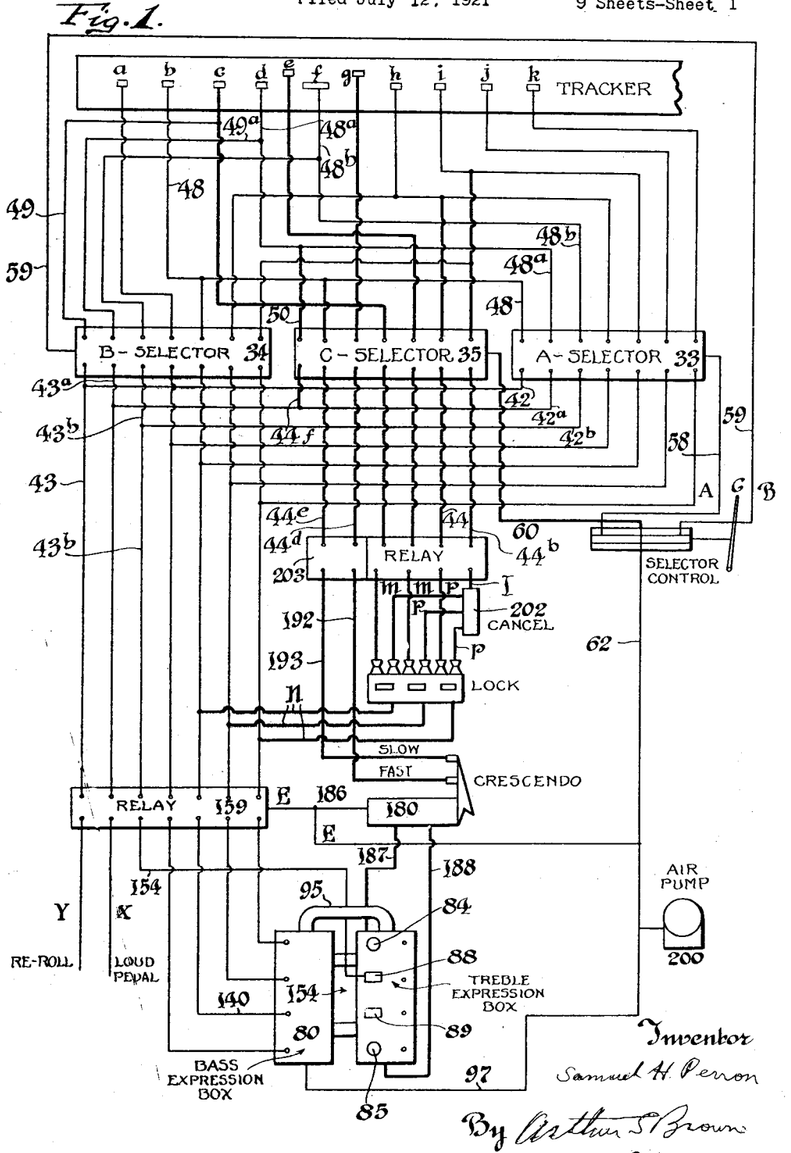
Figure 1 is a diagram illustrating a reproducing piano organized so as to utilize three different kinds of note sheets, hereinafter referred to as A, B, and C, respectively. In this figure the selectors utilized with the several sheets are indicated by these letters, as well as by their designating numerals. This diagram illustrates the bass end of the tracker on a large scale and the pneumatic connections therefrom to the various expression and controlling devices.

In Fig. 1 which shows the group of expression and control holes at the bass end of the universal tracker D, these holes are designated by the letters a to k inclusive. Of these holes, j and k are used for expression purposes only when the A note sheet is employed. Hole a is used only when the B note sheet is employed. Holes e and g are used only when the C note sheet is employed. Of the remaining holes only d and h are used for the same purpose with all three note sheets.

In the piano using the A sheet the four holes h, i, j and k, are used to control the intensity of the suction in the wind chests. Hole f is used to accent the theme in the bass. Hole d is used to control the loud pedal. Hole b is used to control the re-roll.

In this piano the expression holes h, i, j, k, are alongside note holes which are inoperative when the expression holes are used, and are brought into action when an ordinary unexpressive 88 note sheet is employed.

In the piano using the B sheet, the tracker holes d, f, h and i, have the same offices as the corresponding holes in the piano using the A sheet. In addition, the piano using the B sheet utilizes the tracker hole a to control the intensity of the degree of suction in the bass wind chest; tracker hole b governs intensity; and tracker hole c, controls the re-roll.

In the piano using the C sheet, the tracker holes c, e and h control the intensity. Tracker hole i cancels the intensity control valves. Tracker holes b and g govern the slow and fast crescendos respectively. Tracker hole d controls the loud pedal. In this piano the re-roll is governed by hole b (Fig. 4) at the treble end of the tracker.

Similarly, the expression and control holes at the treble end of the tracker differ in arrangement in these three pianos.

From this statement it is apparent that some special instrumentalities must be employed to enable all three note sheets to be successfully used on the same piano.

*Selector.*—This capacity for conditioning the piano to play with all three of the designated note sheets results from the selector devices which are employed.

There are as many selector valve boxes as there are note sheets playable. In the present case, three such boxes 33, 34 and 35 are shown. As indicated in Fig. 1, the selector valve box 33 is active when an A note sheet is employed, the box 34 is active when a B note sheet is employed, and the box 35 is active when a C note sheet is employed.

Figures 6, 7A, 8:
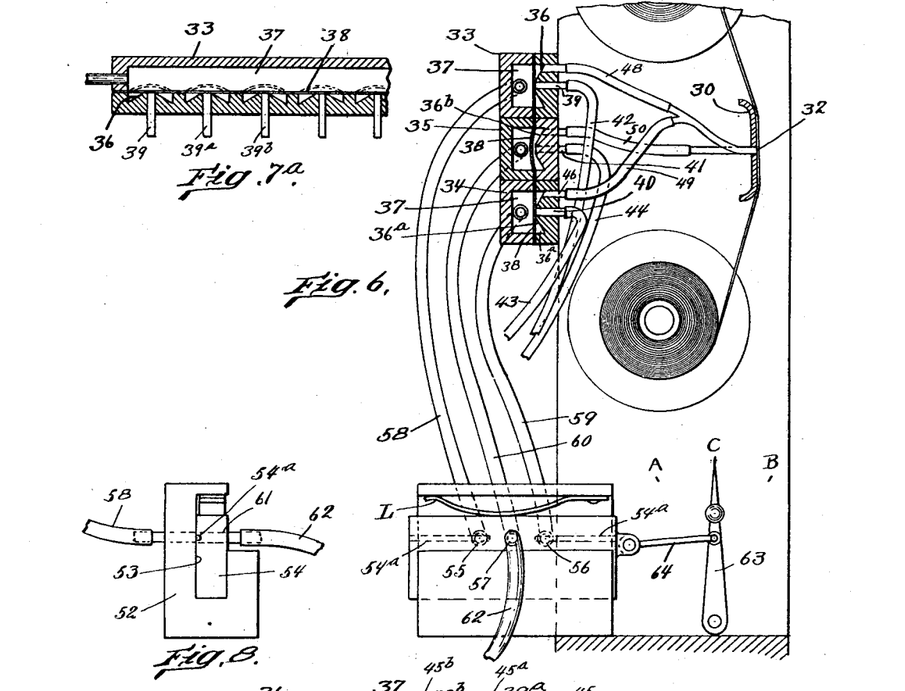
Fig. 6 is a transverse section taken through the tracker and illustrating more particularly the means for selecting the proper expression and control holes of the tracker to correspond with the particular note sheet to be played.
Fig. 8 is an end view of the manually-operable selector control.
Figure 7:
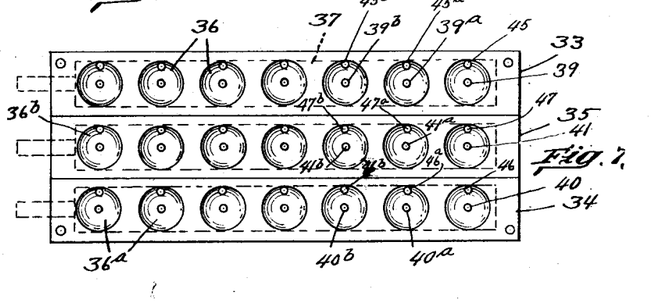
Fig. 7 is a plan detail of the selector valve boxes.

The construction of these selector valve boxes is best shown in Figs. 6, 7 and 7ª. Each box has a wind chamber 37 which is adapted to be put into operative communication with the suction side of the air pump by the selector control shown in Figs. 6 and 8. Each selector valve box has at one side a series of compartments, each constituted by a conical valve seat 36 (as shown in Fig. 7ª) which is separated from the wind chamber 37 by means of a pneumatic valve 38. Each of these pneumatic valves is constituted by a flexible diaphragm or pouch which entirely surrounds and covers the corresponding compartment and valve seat 36 and isolates it from the wind chamber. There are as many of these valve seats and pneumatic valves for each selector box as there are expression and control holes in the tracker for each corresponding variety of note sheet.

Fig. 7ª is a longitudinal section through the upper selector box 33, and the cooperating valve seats are designated by the numeral 36. The valve seats for the lower box 34 are indicated in Fig. 6 by the reference numeral 36ª; and the valve seats for the intermediate box 35 are indicated in Fig. 6 by the reference numeral 36ᵇ.

Each pneumatic valve 38 controls the passage of air from a duct or pipe leading thereto from a hole in the tracker to a duct or pipe governing the particular expression or control device controlled by that tracker hole. A description of one pair of ducts or pipes and the corresponding pneumatic valve will suffice for all.

As shown in Fig. 6 a duct 48 leads from one hole in the tracker to the base of the corresponding compartment between the conical valve seat 36 and the valve 38. A second duct 39 leads from the apex of the conical valve seat 36 to control the corresponding expression or control device.

Normally, each outgoing duct 39 is closed and sealed by the corresponding valve 38 so that there is no passage of air from duct 48 to duct 39. Also, normally, the wind chamber 37 is vented to the atmosphere, as described hereinafter under the heading selector control so that the valves 38 are maintained in their duct closing positions by the partial vacuum normally in the ducts 39, when the piano is automatically played.

If, however, the wind chamber 37 of one of the selector boxes should be put into communication with the suction side of the air pump, as is shown to be the case with the middle box 35 in Fig. 6, then all of the valves 38 within that box will be drawn away from their seats, as there shown (due to the great area of a valve as compared with that of the duct closed by it) thereby putting the ducts of each pair in communication with each other. Accordingly, if a hole in the tracker which is in communication with the compartment of an open valve 38 is then uncovered by a corresponding aperture in the note sheet both ducts of the pair will be vented to the atmosphere and the control or expression device governed thereby will be brought into action.

In the drawings, the ducts or passages which lead from the tracker to the A box 33 are designated by the numerals 48, 48ª, 48ᵇ, etc.; and the pipes extending from this box are designated as 39, 39ª, 39ᵇ, etc.; and from these pipes lead tubes or ducts 42, 42ª, 42ᵇ, etc.

The ducts which lead from the tracker to the B selector box 34 are designated by numerals 49, 49ª, 49ᵇ, etc.: and the pipes leading from this box are indicated by the numeral 40, from which extend the tubes or ducts 43, 43ª, 43ᵇ, etc.

Similarly, the ducts leading from the tracker to the C selector box 35 are designated by the numerals 50, 50ª, 50ᵇ, etc.; and the pipes extending therefrom are indicated by the numeral 41 from which extend ducts or tubes 44, 44ª, 44ᵇ, etc.

Since the pipes 39, 39ª, 39ᵇ, 40 and 41 are ordinary mechanical expedients for the attachment of the tubes leading therefrom, they are omitted from the diagrammatic Fig. 1.

It has already been pointed out that some of the holes in the tracker are used for all three note sheets, and in other instances some of the tracker holes are used with two or more of the varieties of note sheets. In such instances the duct leading from such a hole in the tracker is branched so as to communicate with more than one of the expression boxes. Take, for example, the tracker hole $d$, shown in Fig. 1, which is common to all three note sheets and which acts when exposed to control the loud pedal in each case. As shown in Fig. 1, the duct leading from this hole $d$, has three branches, one branch 49ª leading to the B expression box; a second branch 50 leading to the C expression box; and a third branch 48ª leading to the A expression box.

Similarly, it will be noted from Fig. 1, that each duct leading from each of the tracker holes $b$, $c$, and $f$, has two branches; and each duct leading from each of the tracker holes $h$ and $i$ has three branches.

*Selector control.*—In order to play with a particular note sheet it is necessary that its corresponding selector valve box should be put into communication with the suction side of the air pump and that the other selector valve boxes should be vented to the open air. This result is achieved by a manually-operated selector control, shown best in Figs. 6 and 8.

A slide valve 54 is mounted to slide in a valve block 52 and is maintained in any adjusted position by a flat leaf spring L, as shown in Fig. 6. This valve block is connected by a link 64 with a hand lever 63. The upper end of this hand lever constitutes an index finger cooperating with the appropriate note sheet designations A, B, and C, and when the hand lever is moved by the user so that the index finger points to one of these letters, the selector will be properly adjusted so that the corresponding note sheet can be played. The valve block has three ducts, 55, 56 and 57, in line with each other which extend from the outer face of the valve block to the seat 53 against which the valve 54 slides. The duct 55 communicates through the pipe 58 with the A selector box 33. The duct 56 communicates through the pipe 59 with the B selector box 34. The duct 57 communicates through the pipe 60 with the C selector box 35.

Figure 2:
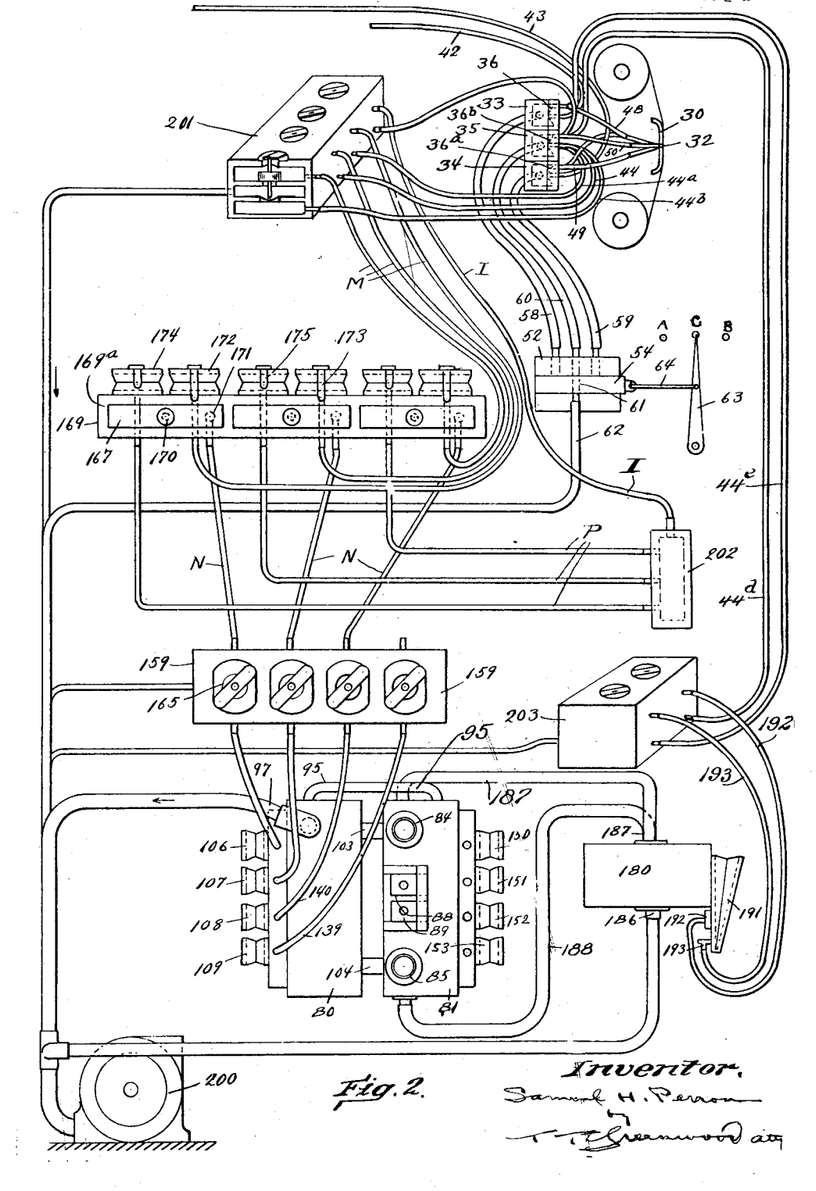
Fig. 2 is a diagram illustrating in greater detail the portion of the apparatus utilized in playing with the C note sheets, other parts of the complete system being omitted.
Figure 3:
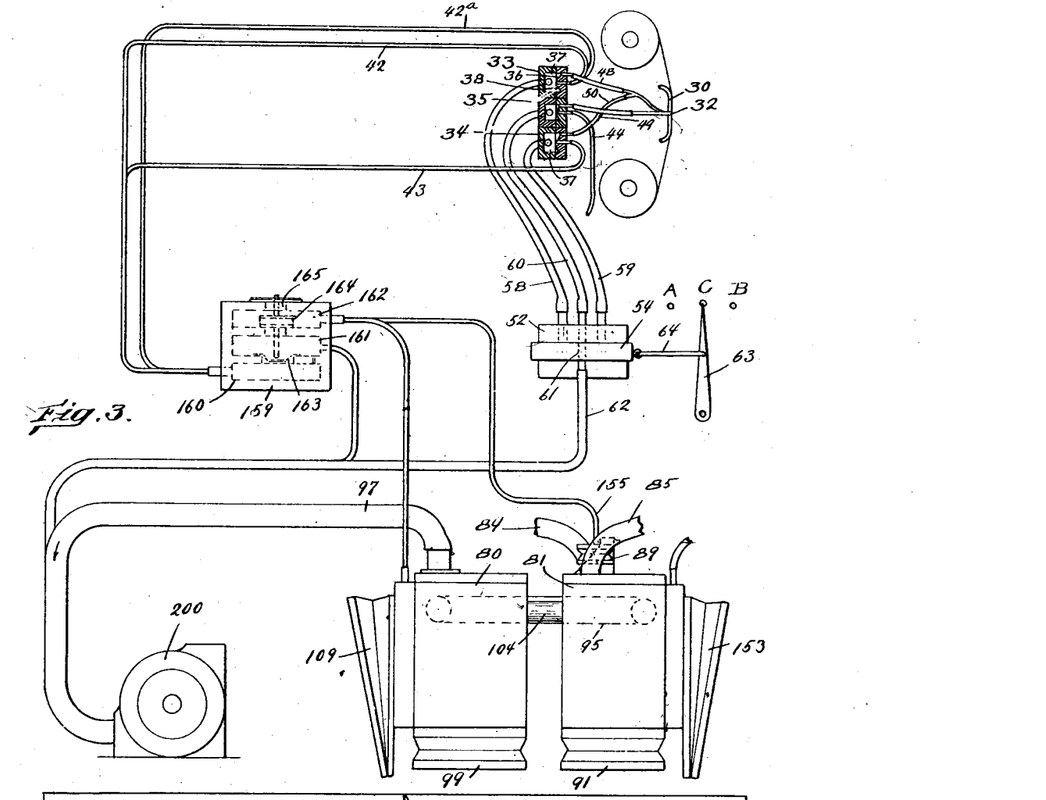
Fig. 3 is a diagram illustrating the portion of the apparatus which is utilized in playing with the other two note sheets A and B, other parts of the complete system being omitted.

The slide valve has a duct 61 (Fig. 8) extending entirely across it in the plane of the three ducts 55, 56 and 57. This valve duct 61 communicates through a flexible pipe 62 with the suction side of the air pump 200, as shown in Figs. 1, 2 and 3. By sliding the valve 54 any one of the ducts 55, 56 and 57 can be registered with the duct 61, and, accordingly, the wind chamber of any one of the selector boxes can be brought into communication with the air pump. As shown in Fig. 1, the hand lever 63 is in its intermediate position pointing to C, and when in this position the slide valve duct 61 registers with the intermediate duct 57 of the valve block, and, consequently, the wind chamber 37 of the C selector box 35 is in communication with the suction side of the air pump with the result that all of the communicating valves 38 are opened, and the apertures in the C note sheet can then control the action of the expression and control devices.

In this intermediate position, shown in Fig. 6, the other two selector boxes 33 and 34 are vented to the open air by means of two longitudinal channels 54ª, in the face of the slide valve adjoining the valve seat 53. Accordingly, these selector boxes are maintained idle and inactive, while the C note sheet is in use.

If the hand lever is moved so as to point to A, then the right-hand venting channel 54ª will communicate with both ducts 56 and 57 and hence will vent both boxes 34 and 35. Similarly, if the hand lever 63 is moved so as to point to B, then the left hand channel 54ª in the valve seat will communicate with both ducts 55 and 57, and the two boxes 33 and 35 will be vented.

*Relays.*—As indicated in Fig. 1, the pipes extending from the selector valve boxes do not lead directly to the expression and control devices, but lead to relays from which other pipes lead to the expression and control devices. All of the relay valves are alike so that it suffices to refer to a single relay valve such as is specifically shown in Figs. 15, 16 and 17.

Figures 14, 15, 16, 17, 18, 19:
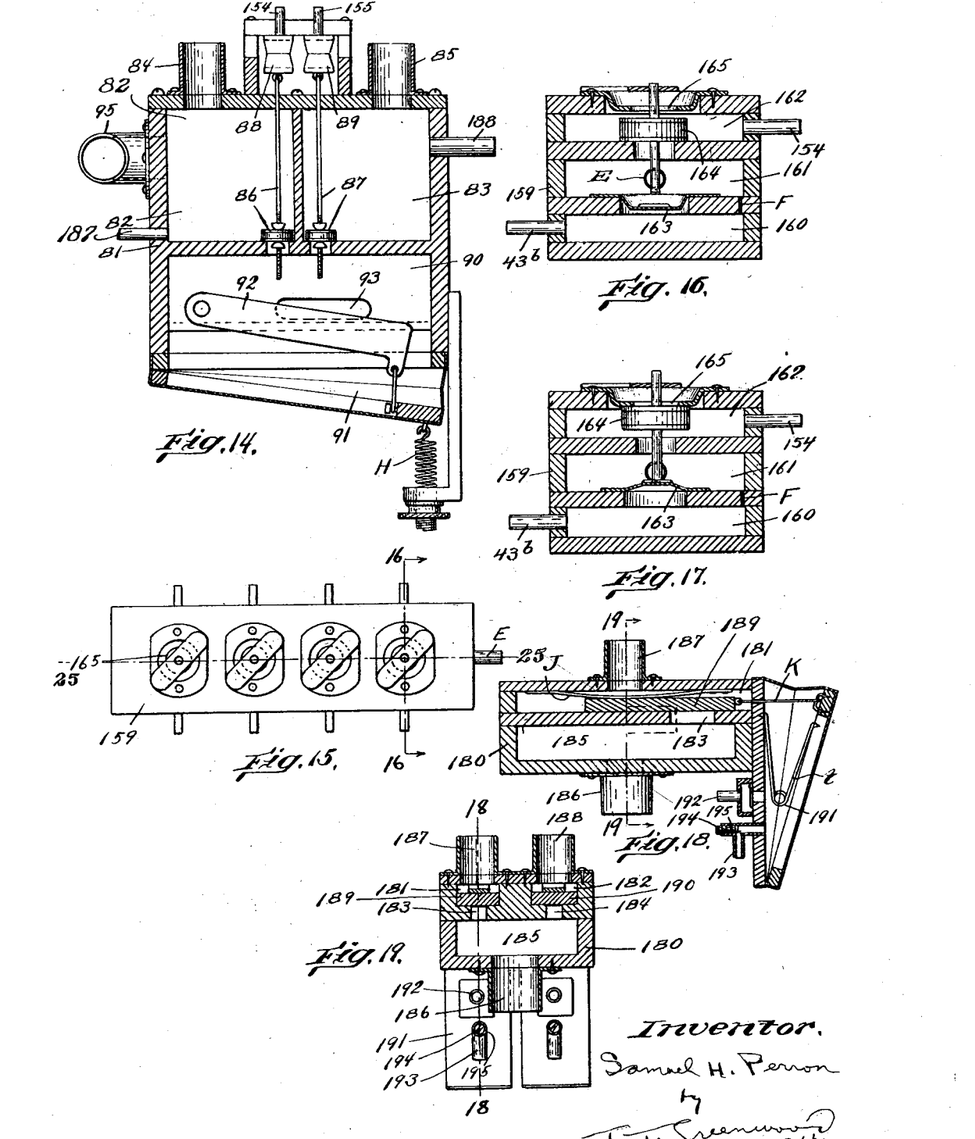
Fig. 14 is a section in the plane indicated by the line 14—14 in Fig. 12.
Fig. 15 is a plan view of a relay valve box.
Fig. 16 is a section in the plane indicated by the line 16—16 in Fig. 15.
Fig. 17 is a section similar to that of Fig. 16, but showing the valve in raised position.
Fig. 18 is a longitudinal section in the plane indicated by the line 18—18 in Fig. 19, illustrating a crescendo pneumatic used in connection with the C note sheet.
Fig. 19 is a cross-section in the plane indicated by the line 19—19 in Fig. 18.

The relay box 159, shown in these figures, has a wind chamber 161 which is in constant communication with the suction side of the air pump through the pipe E. Above the wind chamber 161 is a series of valves 164, each located in its own valve compartment 162. From this valve compartment extends a pipe to the corresponding expression or control device to be governed by the particular valve. In Fig. 16, the particular pipe 154 indicated is the one which leads to the accent pneumatic 88 (Figs. 1 and 14).

Above the valve 164 is a vent 165 from the valve chamber 162 to the open air. Normally, the valve 164 is in its position shown in Fig. 16, opening the vent 165 and closing the passage beneath to the wind chamber 161. The corresponding expression or control device, such as the accent pneumatic 88, is hence normally vented to the atmosphere.

Below the wind chamber 161 is a series of compartments 160, one for each of the expression or control devices. Each chamber 160 has an opening at its top which is closed by a weighted flexible diaphragm or pouch 163 which on its upper side is exposed to the suction within the wind chamber 161. This pouch is immediately beneath the stem of the valve 164. A minute bleed duct F, establishes a permanent connection between the wind chamber 161 and the compartment 160. Each compartment 160 communicates with one of the selector boxes. In the particular instance shown in Figs. 16 and 17, the chamber 160 communicates by pipe 42ᵇ with one of the ducts in the A selector box 33 and through a branch pipe 43ᵇ with one of the ducts in the B selector box 34.

Assuming that the A note sheet should be in use then there would be a continuous passage from the tracker hole *f* through the pipes 48ᵇ and 42ᵇ, as shown in Fig. 1, to the compartment 160, shown in Figs. 16 and 17. As long as the tracker hole *f* is closed by the note sheet, there is a partial vacuum in these pipes by reason of the bleed F, between the wind chamber 161 and the compartment 160. Accordingly, the weighted pouch 163 having equal air pressures above and below is maintained by gravity in the position shown in Fig. 16 and the valve 164 is in its down position, closing communication between the wind chamber 161 and the compartment 162, and venting that compartment to the open air. Hence, the normal condition being that when the tracker holes are closed by the note sheet, there is normal suction in the then active ducts leading from the tracker.

When, however, a hole in the tracker is uncovered by the note sheet, say the hole *f*, then the duct leading from that hole is vented to the open air and the pressure in the corresponding compartment 160 (Fig. 16) rises rapidly to atmospheric pressure so that the pressure in the compartment 160 becomes greater than that in the suction wind chamber 161. Accordingly, the pouch 163 is instantaneously raised to the position shown in Fig. 17, thereby lifting the valve 164 so as to close the vent 165 and to put the valve compartment 162 into communication with the wind chamber 161, whereupon air is sucked through pipe 154 reducing the air pressure therein and bringing into action the particular device (accent pneumatic 88) controlled by such pipe 154.

As soon as the traveling note sheet again covers the tracker hole *f*, the corresponding compartment 160 shown in Fig. 17, being no longer vented to the open air, has its pressure reduced through the bleed F, thus again equalizing the pressure in chamber 160 and compartment 161. Thereupon, the weighted pouch 163 drops to the position shown in Fig. 16 and the valve 164 drops both owing to its weight and the excess air pressure on its upper side, thereby again venting pipe 154 to the open air and hence restoring the device 88 controlled by pipe 154 to its normal position.

These relay valves respond quickly to the small flow of air through the tracker holes and permit larger passages to be employed leading to the expression and control devices, thus insuring their quick response in accordance with the customary office of relay valves.

The relay box 159, as shown in Fig. 1, has seven relay valves, only four of which are shown in Fig. 2 since they suffice to illustrate the characteristics peculiar to the mechanism employed when the C sheet is used. Special relay boxes 201 and 203 are also shown in Figs. 1 and 2 which are peculiar to the C note sheet mechanism and their relay valves are constructed and operated in the same way as the relay valves of the relay box 159.

*Re-roll and pedals.*—The hole $d$ in the tracker controls the loud pedal for all three note sheets. As shown in Fig. 1, the pipe 43ª leads from the B box 34 to the relay 159, and a corresponding pipe X leading from the relay extends to the device for controlling the loud pedal. The particular devices for controlling the loud pedal are not shown in the accompanying drawings because ordinary devices are employed having no novelty. A pipe 42ª leading from the A selector box leads to and communicates with the pipe 43ª, as shown in Fig. 1, so that the same loud pedal control is governed when the A sheet is employed. A pipe 44ª leads from the C selector box to the pipe 42ª and hence controls the loud pedal. The soft pedal effects are controlled from the treble end of the tracker when using any one of the designated note sheets.

The tracker hole $c$ shown in Fig. 1, controls the re-roll when the B sheet is employed. Pipe 49 leads from tracker hole $c$ to the B selector box 34; pipe 43 leads thence to the relay 159 and a pipe Y leads from the relay to the devices which effect the re-roll. These devices are well known and are not shown in the drawings.

Similarly, branch pipe 48 leads from tracker hole $b$ to the A selector box 33 and from thence pipe 42 leads to and communicates with pipe 43 and hence controls the re-roll.

The re-roll connections when the C note sheet is used are not shown in Fig. 1 because that figure shows only the devices controlled from the bass end of the tracker and in the piano using the C sheet the re-roll is controlled by a hole $l$ (Fig. 4) at the treble end of the tracker.

*Expression box.*—The expression pipes from the A and B selector boxes lead to the relay 159, as shown in Figs 1 and 3, and from this relay corresponding pipes lead to the expression boxes 80 and 81. These expression boxes are shown in detail in Figs. 10, 11, 12, 13 and 14. They are herein called "bass" and "treble" because they are controlled from holes at the bass and treble ends respectively of the tracker.

Figure 11:
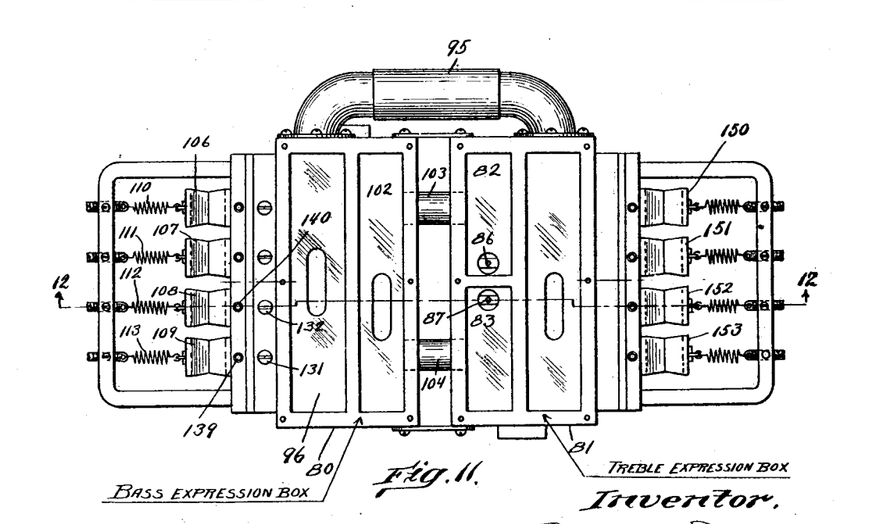
Fig. 11 is a view similar to Fig. 10 with the top cover removed.
Figure 12:
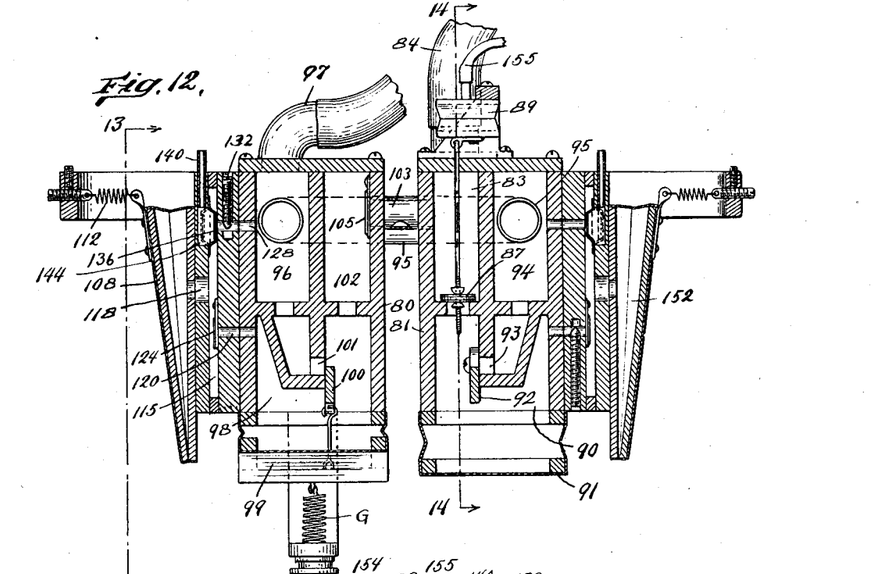
Fig. 12 is a vertical section of the expression boxes in the plane indicated by the line 12—12 in Fig. 11.

The bass expression box 80 has a wind chamber 96, shown in Figs. 11 and 12, which is in constant communication through pipe 97 with the suction side of the air pump 200, as shown in Figs. 1, 2 and 3, so that, when the piano is playing, a partial vacuum is constantly maintained in the chamber 96. This compartment has an outlet 101, shown in Fig. 12, which is controlled by a swinging knife valve 100. This knife valve is connected with a regulating pneumatic 99, (Fig. 13) the movable board of which is under the stress of a spring G, which tends to open the valve 100 in opposition to the partial vacuum maintained in the variable pressure compartment 98 into which the outlet 101 opens. The tension of this spring G, is adjustable so that the valve 100 partly closes the outlet 101 and thereby determines the normal degrees of suction in the striker pneumatic wind chests, this pressure being that employed to produce the pianissimo effect. As shown in Fig. 12, the compartment 98 communicates at all times with a chamber 102 which is in communication through passage 103 with a compartment 82 in the treble expression box 81, as shown in Fig. 11, and from the upper end of this compartment 82 a pipe 84 (Fig. 14) leads to the usual bass wind chest (not shown) for the striker pneumatics. Likewise, as shown in Fig. 11, the chamber 102 communicates through pipe 104 with a compartment 83 in the treble expression box 81; and, as shown in Figs. 10 and 14, this compartment 83 communicates through pipe 85 with the usual treble wind chest (not shown) for the striker pneumatics.

Each of the passages 103 and 104 at its suction side is covered by a swinging check valve 105 located in the compartment 102, as shown in Fig. 12. These check valves open freely in response to suction in the compartment 102 so that they do not interfere with the creation of suction in the bass and treble wind chests produced in the vacuum chamber 96. But, in the event that a greater degree of vacuum or suction is created in one of the compartments 82 or 83 of the treble expression box as compared with the suction in the compartment 102, the corresponding check valve 105 closes and the greater degree of suction in such compartment 82 or 83 is not reduced by the lower suction which may then be in the compartment 102.

Provision is made for increasing the degree of vacuum in the two wind chests for the striker pneumatics by putting the chamber 102 into freer communication with the wind chamber 96 (see Fig. 12) than is permitted by the valve controlled outlet 101.

Provision is made for by-passing at four different places the suction from the chamber 96 to the compartment 98 and thence to the chamber 102 around the outlet 101 and the valve 100. One of these by-passes is shown in Fig. 12, wherein a duct 128 is shown leading from the chamber 96 to a channel 115, shown also in Fig. 13. The capacity of this duct 128 can be regulated by an adjusting screw 132. The outlet from this duct 128 to the channel 115 is normally closed by a pouch or diaphragm valve 136. The compartment 144 at the side of this valve opposite the passage 128 communicates with a pipe 140; and this particular pipe, as shown in Fig. 1, extends to one of the relay valves in the relay box 159, and is controlled by the tracker hole $b$ when the B note sheet is used, by the tracker hole $e$ when the C note sheet is used, and by the tracker hole $i$ when the A note sheet is used. Owing to the relay construction, shown in Figs. 16 and 17, the pipe 140 is normally vented to the open air so that there is atmospheric pressure in the compartment 144 (Fig. 12) and as the other or inner right hand side of the pouch valve is exposed to lower pressure it is normally maintained in the position shown in Fig. 12, closing the duct 128.

When, however, a corresponding expression hole in the tracker is opened, then through the action of the relay valve suction is created in the compartment 144, at the outer left hand face of the pouch valve 136 and the duct 128 is opened. Suction is thus created in the channel 115 and a light check valve 124 (Figs. 12 and 13) in the channel opens, thereby uncovering a duct 120 leading from channel 115 to the compartment 98. Accordingly, increased suction is then created in compartment 98, chamber 102, compartments 82 and 83 (Fig. 14), pipes 84 and 85 and the bass and treble wind chests of the striker pneumatics. As the result there is a greater intensity of suction in the wind chests and each of the striker pneumatics then brought into action by the note sheet produces a more powerful blow upon the corresponding piano strings.

Figure 13:
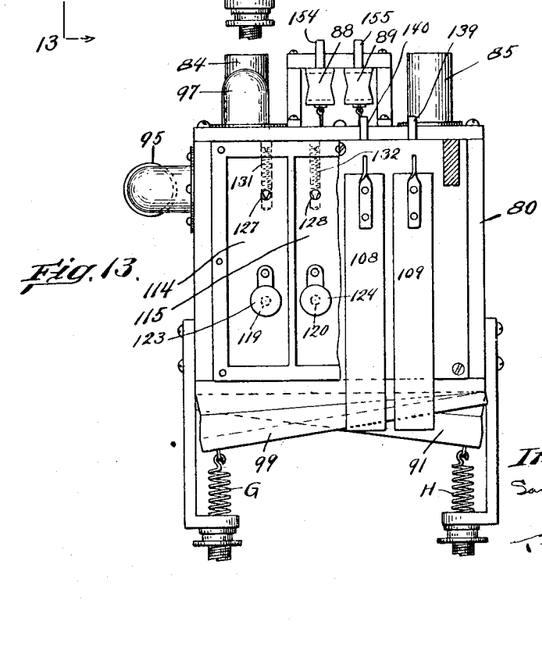
Fig. 13 is a side view of the expression boxes from the point of view indicated by the line 13—13 in Fig. 12, a portion of the side wall being removed to expose the intensity expression valves.

There are four such by-pass ducts leading from the vacuum chamber 96 to corresponding channels and thence through as many valved ducts similar to the duct 120 to the compartment 98. Fig. 13 shows two of these channels, 114 and 115 respectively; two of the by-pass ducts 127 and 128; and two of the ducts 119 and 120, leading to the compartment 98, closed respectively by hinged check valves 123 and 124.

Each of the four by-pass ducts from the vacuum chamber 96 is controlled by its own pouch valve, similar to the valve 136 shown in Fig. 12, and correspondingly there are four pipes leading therefrom to four of the relay valves, as shown in Fig. 1, and thence to corresponding holes in the tracker for the three note sheets.

These four pneumatic pouch valves constitute intensity or dynamic pneumatics. When all four of these intensity pneumatic valves are opened concurrently the maximum degree of suction is created in the wind chests for the striker pneumatics, and the loudest sound is produced. By appropriate location of the holes in the note sheet any number of the by-pass communications from the vacuum or wind chamber 96 (Fig. 12) to the wind chests can be opened, or all can be maintained closed. The relative capacity of the several passages can be varied by the adjusting screws 131, 132, and the several passages can be uncovered in various permutations by the opening of one or more of the controlling tracker holes. Thus provision is made for a large range in the force with which the piano strings may be struck by the hammers.

In the arrangement shown in Fig. 1, the four intensity pneumatics of the bass expression box are controlled respectively by the tracker holes $h$, $i$, $j$ and $k$, when the A note sheet is employed.

When the B note sheet is employed, these four intensity pneumatics are controlled by the tracker holes $a$, $b$, $h$ and $i$.

When the C note sheet is employed only three of the intensity pneumatics are controlled, and tracker holes $c$, $e$ and $h$ are utilized for this purpose.

The treble expression box 81 has a vacuum wind chamber 94 (Fig. 12) which is in constant communication with the vacuum chamber 96 through the connecting pipe 95 (Fig. 11) and hence in constant communication with the suction side of the air pump. This vacuum chamber 94 has an outlet 93 into a compartment 90 and this outlet is partly closed by a regulating knife valve 92 connected with the movable board 91 of a regulating pneumatic, as best shown in Fig. 14, the position of the pneumatic being governed by an adjustable spring H. as in the case of the corresponding parts of the bass expression box. Also, there are four by-pass communications from the vacuum chamber 94 to the compartment 90, each closed by an intensity pneumatic consisting of a pouch valve, these intensity pneumatics being controlled from the expression holes at the treble end of the tracker in just the same way as in the case of the expression control at the bass end of the tracker, as already described.

There is an important difference, however, between the treble expression box and the bass expression box. As already pointed out the variable pressure chamber 102 in the bass expression box communicates directly with both compartments 82 and 83 in the treble expression box, thereby varying the degree of vacuum in the treble wind chest as well as in the bass wind chest. But in the case of the treble expression box there is no constantly open communication between the chamber 90 and the compartments 82 and 83, since the communicating ports thereto are normally closed by valves 86 and 87, as shown in Fig. 14. In order, therefore, that the regulating valve and the intensity pneumatics of the treble expression box shall be effective it is necessary that one or both of the valves 86 and 87 should be opened.

The valve 86 which is located in the compartment 82 communicating with the bass wind chest through pipe 84 is controlled by a pneumatic 88. This pneumatic 88 communicates by pipe 154 (see Fig. 1) with a relay valve in the relay 159 and is governed by tracker hole $f$ at the bass end of the tracker when either the A or B note sheet is used. This accent or theme pneumatic 88 is not used when the C note sheet is employed.

Accordingly, when a particular note in the bass is to be accented, the tracker hole $f$ is uncovered and, as the result, a partial vacuum is created within the accent pneumatic 88 whereupon it collapses, its movable board moves upward, the valve 86 (Fig. 14) is opened, and the vacuum in the bass wind chest is augmented by the additional suction from chamber 94, through port 93 and past valve 92, into compartment 82, thus accenting the note.

In this connection, it will be noted, that the vacuum in the compartment 82 due to the opening of the valve 86 is not reduced as the result of a concurrently lesser vacuum in the compartment 102 because in such case the check valve 105 (shown in Fig. 12) closes the passage from compartment 102 to compartment 82.

If, concurrently, intensity pneumatics (one or more) of the treble expression box have been opened there will be a correspondingly greater suction in the compartment 82 and hence in the bass wind chest, thereby variably accenting the particular bass note or notes then brought into action by the note sheet. When tracker hole $f$ is again covered atmospheric pressure enters the pneumatic 88, equalizing its internal and external pressures, whereupon the pneumatic distends by gravity aided by suction on the valve 86, and said valve closes.

Correspondingly, the valve 87 which governs the communication between chamber 90 and compartment 83 (Fig. 14) in the treble expression box is connected with the movable board of an accent or theme pneumatic 89, the interior of which communicates through a pipe 155 to a relay valve and thence to an expression hole at the treble end of the tracker. Hence, when that hole is opened the accent pneumatic 89 will collapse, the valve 87 will open and an increased degree of vacuum will be produced in the treble wind chest depending upon how many of the intensity pneumatics of the treble expression box are concurrently opened by corresponding holes in the note sheet.

Here it will again be noted that the check valve 105 (see Fig. 12) automatically closes in the event that the vacuum in compartment 102 is less than that in compartment 83.

Thus, the particular notes at the treble end of the piano which are brought into action by apertures in the note sheet will be accented.

The treble accent or theme pneumatic 89 is not controlled by the C note sheet, but is controlled by the A and B note sheets.

Figure 10:
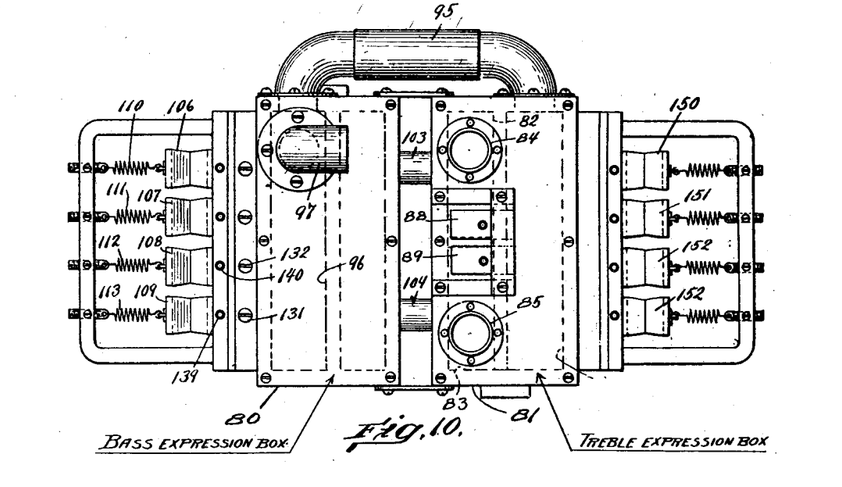
Fig. 10 is a plan view of the improved expression boxes.

Auxiliary regulating pneumatics may be employed such as are shown in Figs. 10, 11 and 12. There are four such regulating pneumatics 106, 107, 108 and 109 on the bass expression box, one for each of the intensity pneumatics 136, and correspondingly there are four such regulating pneumatics 150, 151, 152 and 153 for the treble expression box, one for each of the intensity pneumatics. The construction of these pneumatics is shown in Fig. 12. As there shown, the interior of pneumatic 108 communicates through a port 118 with the channel 115 and the outer movable board of the pneumatic is pulled upon by an adjustable spring 112. This pneumatic collapses to the extent permitted by its regulating spring when the by-pass duct 128 is opened. In case a chord of many notes is struck thus consuming a large volume of air and tending to reduce the degree of vacuum in the wind chest, the regulating pneumatics then in action expand and substantially maintain the degree of vacuum. When the valve 136 again closes the duct 128, the spring 112 moves the movable board of the pneumatic outwardly thus maintaining a partial vacuum in the channel 115 and taking care of leakage.

These regulating pneumatics are not essential and may be omitted.

*Lock and cancel valves.*—The piano using the C note sheet differs from the pianos using the A and B note sheets in that it has certain valves which are locked in open position as the result of the note sheet uncovering certain expression holes and they remain open until cancelled by a subsequent perforation in the note sheet uncovering a particular control hole in the tracker.

The present improved piano includes lock and cancel valves which are utilized only when the C note sheet is employed. This lock and cancel valve mechanism for the bass is indicated in Fig. 1 and Fig. 2 and is shown in detail in Figs. 20 and 24 inclusive.

There are three of these valves 167 each centrally pivoted at 168 to a valve block 169. Each valve swings across the valve seat face 169$^a$ of the valve block. Each valve controls a duct 171 in the valve block. From these three ducts 171 lead pipes N extending to the relay 159 (Figs. 1 and 2) and through the relay control three of the intensity pneumatics of the bass expression box. This mechanism is duplicated for the treble.

Figure 20:
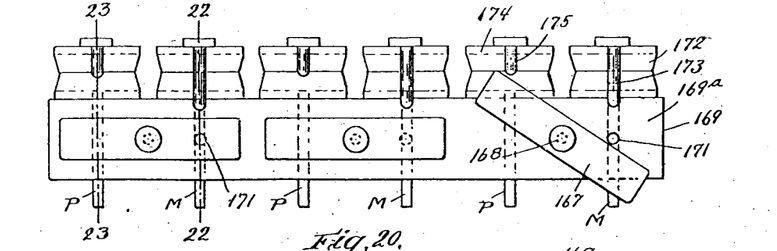
Fig. 20 is a front view of the "lock and cancel" valve box which is used in connection with the C note sheet.
Figure 21:
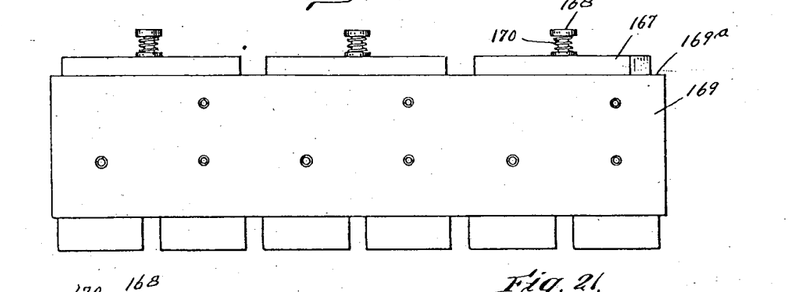
Fig. 21 is a bottom view of the lock and cancel valve box.
Figures 22, 23, 24, 25:
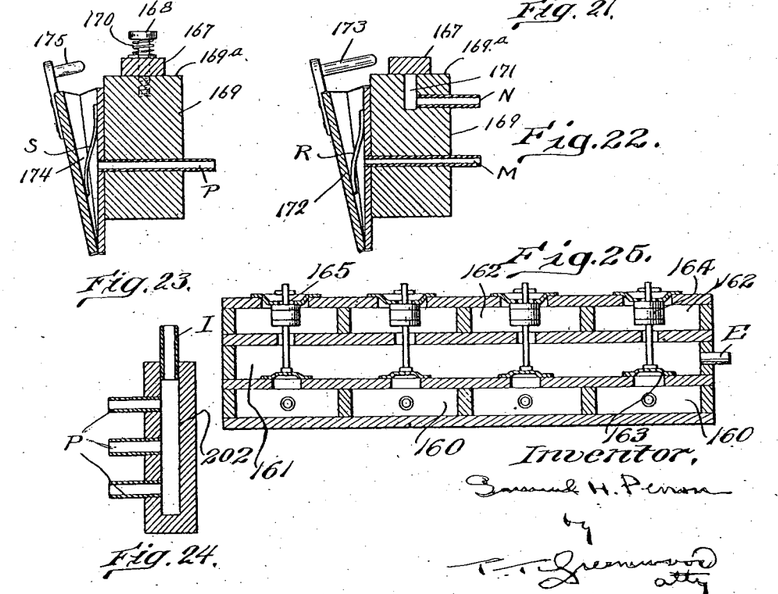
Fig. 22 is a cross section in the plane indicated by the line 22—22 in Fig. 20.
Fig. 23 is a cross-section in the plane indicated by the line 23—23 in Fig. 20.
Fig. 24 is a sectional detail of a junction box used in the cancellation or closing of the valves in the box shown in Fig. 20.
Fig. 25 is a longitudinal section of the portion of the relay valves illustrated in Fig. 15, the section being taken in the plane indicated by the line 25—25 in Fig. 15.

Normally, the valves 167 are in position to close the ducts 171, as shown in the case of the two valves at the left in Fig. 20. Each valve is acted upon by two pneumatics 172 and 174 located at opposite sides of the pivot 168 of the valve. The pneumatic 172 acts to open the valve, while the other pneumatic 174 acts to close it. As shown in Fig. 22, the opening pneumatic 172 which is normally expanded by a spring R has a striker 173 on its movable board which is located in the plane of the valve.

The pipes M, M, leading from the pneumatics 172 and 174 do not lead directly to the C selector valve box, but lead to a relay 201, the construction of which is exactly like that of the relay 159 heretofore described. From this relay 201, as shown in Figs. 1 and 2, extend the pipes 44, etc., leading to the C selector valve box.

When a corresponding tracker opening is uncovered by an aperture in the note sheet (namely, one of the tracker holes c, e or h) the action of the intervening relay 201 (Figs. 1 and 2) is to create suction within the interior of the corresponding pneumatic 172, whereupon its movable board collapses, its striker 173 hits the valve 167 at one side of its pivot, thereby swinging the valve to the position shown at the right in Fig. 20, and venting the passage 171; and, hence, through a pipe N (Figs. 1, 2 and 22) to the relay 159, opening the corresponding intensity pneumatic valve.

The valve 167 remains in this open position after the aperture in the note sheet has again closed the controlling tracker hole and after the opening pneumatic 172 has again been expanded by its spring. The valve 167 is substantially locked in this open position as the result of the friction due to the spring 170 (Fig. 23) surrounding its pivot 168.

The valve remains open until its closing pneumatic 174 is collapsed. This closing pneumatic 174 under the action of a spring s normally stands in the expanded condition shown in Fig. 23 and it has a striker 175 in the plane of the corresponding valve 167, but located on the opposite side of the pivot 168 from the location of the striker 173 of the corresponding opening pneumatic.

All of the closing pneumatics 174 for all of the lock and cancel valves 167 are controlled by the same hole i in the tracker. When this hole i is uncovered by an aperture in the note sheet the action, through the relay 201, is to create suction in a pipe I, Figs. 1 and 2, leading to a junction box 202 (Figs. 2 and 24) from whence pipes p lead to the closing pneumatics 174 for the three valves. As the result of the suction thus created within the closing pneumatics 174 they are all collapsed and whichever of the strikers 175 finds a valve 167 in its path it swings that valve so as to close the corresponding vent 171. Accordingly, the corresponding intensity valves which are then open are closed.

*Crescendo mechanism.*—In the piano using the C note sheet crescendos are employed as a part of the expression system and are shown in Figs. 18 and 19. There are two crescendos, one for the bass and one for the treble. The crescendo mechanism includes a box 180 upon which the governing pneumatics 191 are mounted and this box has a vacuum wind chamber 185 in constant communication through pipe 186 (Figs. 1 and 2) with the suction side of the air pump. Associated with this wind chamber are two compartments 181 and 182, (Fig. 19) connecting respectively with the wind chamber 185 by the passages 183 and 184. The compartment 181 communicates through pipe 187 with the base compartment 82 (Fig. 14) of the treble expression box. The pipe 187 is broken away in Fig. 2. Its connection with the compartment 82 is indicated in Fig. 1. The compartment 182 communicates through the pipe 188 (Figs. 1 and 2) with the treble compartment 83 of the treble expression box.

Slide valves 189 and 190 are located within the respective compartments 181 and 182 and control the respective passages 183 and 184. Each valve is maintained against its seat by a spring J.

Each valve is connected by a link K, with a corresponding pneumatic 191. Normally, each pneumatic is fully distended by a spring t, as shown in Fig. 18, in which position its connected valve closes the passage between the vacuum chamber 185 and the compartment in which the valve is located. When the pneumatic 191 co-acting say with the bass is collapsed, its valve 189 is moved inwardly thereby uncovering the passage 183 and putting the chamber 181 and pipe 187 into communication with the vacuum chamber 185. Accordingly, additional vacuum is created in the bass compartment 82 (Fig. 14) with which the pipe 187 communicates, thereby increasing the degree of vacuum in the bass wind chest and hence increasing the intensity of any note which is concurrently brought into action.

The valve 189 can be opened either quickly or slowly, thereby producing either a fast or a slow crescendo effect. The interior of each pneumatic 191 communicates (Fig. 18) with outwardly extending pipes 192 and 193. The outlet 195 to the pipe 193 is partially closed by an adjustable screw 194, thus choking the outlet and permitting a slow flow of air to and from the pneumatic 191. The outlet to the pipe 192 is not choked and consequently a freer passage of air to and from the pneumatic 191 is permitted. Accordingly, when pipe 193 is brought into action, a slow crescendo effect occurs; and when pipe 192 is brought into action, a fast crescendo effect is produced.

These pipes 192 and 193 lead to a portion 203 of the relay 201, as shown in Fig. 1. In Fig. 2, this portion 203 of the relay 201 is illustrated detached and separate from the relay 201 for the sake of clearness. Corresponding pipes lead from the relay to the C selector valve box 35 where they communicate with the tracker holes $b$ and $g$. The tracker hole $b$ controls the slow crescendo pipe 193 and the hole $g$ controls the fast crescendo pipe 192.

Thus provision is made for the utilization of all of the expression and control holes of the C note sheet as well as for those of the A and B note sheets.

Figure 9:
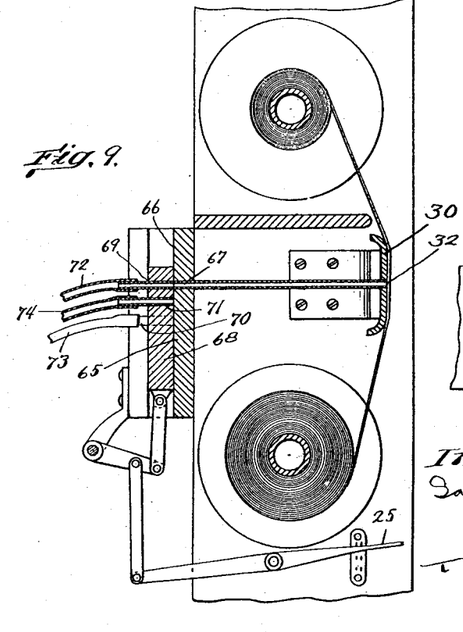
Fig. 9 is a transverse section through the tracker and the music and take-up rolls, illustrating a modified form of selector.
Figure 9A:
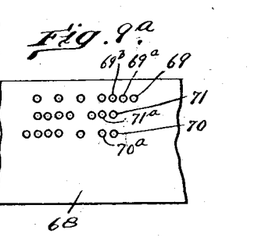

*Modifications.*—Figs. 9 and 9ª illustrate a modified form of selector mechanism. As here shown, the pipes leading from the expression and control holes of the tracker terminate at the valve seat 66 of a guide block 65 for a slide valve 68. This valve 68 has three rows of apertures corresponding in number and location with the apertures in the three note sheets. The uppermost row of holes 69, 69ª, etc., is brought into register with the pipes leading from the tracker when the B note sheet is employed, these apertures corresponding in location with the tracker holes controlled by the B note sheet.

Likewise, the middle row of holes 71, 71ª, etc., corresponds in position and location with the tracker pipes utilized when the C note sheet is employed.

The lowest row of holes 70, 70ª, etc., registers with the tracker pipes when the A sheet is employed. The valve 68 can be shifted to bring any one of these rows of holes into registration with the pipes leading from the tracker by means of the hand lever 25 and the intermediate connections shown in Fig. 9.

From these three rows of holes lead pipes 72, 73 and 74 extending to the relays in just the same manner as in the case of the pipes 42, 43 and 44, already described.

While three particular types of note sheets have been referred to for the purpose of illustration, it is obvious that other types of note sheets may be played by an arrangement of the expression and control holes in the tracker, and a corresponding group of selected expression and control holes.

The invention has been described as applied particularly to pianos, but it can be applied to other instruments, such as organs wherein perforated rolls or the equivalent are employed to govern the playing of the instrument. In the case of an organ, for example, the expression and control holes would govern the stops, couplers and swell shades of the organ and also the re-roll of the note sheet.

The invention has been described as applied to a musical instrument wherein pneumatic means are employed to effect the playing thereof, but it is equally applicable to instruments employing other means to effect the playing.

I claim:

1. An expression system for a reproducing piano including a tracker having a plurality of expression holes, expression devices, and means selectively to connect said expression devices operably with predetermined combinations of expression holes, said means including a plurality of selector valve boxes all of which are connected with all of said expression devices and with predetermined combinations of expression holes, and means to select a specific selector valve box for the control of said expression devices through its combination of expression holes.

2. An expression system for a reproducing piano including a tracker having a plurality of expression holes, expression devices, and means selectively to connect said expression devices operably with predetermined combinations of expression holes, including a plurality of selector valve boxes all of which are connected with all of said expression devices and with predetermined combinations of expression holes, and manually-controlled means to select a specific selector valve box for the control of said expression devices through its combination of expression holes.

3. An expression system for a reproducing piano including a tracker having a plurality of expression holes, expression devices, and means selectively to connect said expression devices operably with predetermined combinations of expression holes including a plurality of selector valve boxes which are connected with all of said expression devices and with predetermined combinations of expression holes, and manually-controlled pneumatic means to select a specific selector valve box for the control of said expression devices through its combination of expression holes.

4. An expression system for a reproducing piano including a tracker having a plurality of expression holes, expression devices, and means selectively to connect said expression devices operably with predetermined combinations of expression holes, including a plurality of pneumatically-controlled selector valve boxes which are connected with all of said expression devices and with predetermined combinations of expression holes, and means to select a specific selector valve box for the control of said expression devices through its combination of expression holes comprising a valve associated with all of said selector valve boxes arranged selectively to connect said selector valve boxes to a source of suction pressure.

5. An expression system for a reproducing piano including a tracker having a plurality of expression holes, expression devices, and means selectively to connect said expression devices operably with predetermined combinations of expression holes including a plurality of pneumatically-controlled selector valve boxes which are connected with all of said expression devices and with predetermined combinations of expression holes, and means to select a specific selector valve box for the control of said expression devices through its combination of expression holes comprising a valve associated with all of said selector valve boxes arranged to select an individual selector valve box for connection to a source of suction pressure and connect all other selector valve boxes to a source of higher pressure.

6. An expression system for a reproducing piano having means to effect the reproduction of expression indicated by the expression perforations in several different types of note sheets the expression perforations in which follow different systems for obtaining varieties of expression, said means including a tracker having a plurality of expression holes some of which are arranged to register with the expression perforations in each of several different types of note sheets, in combination with means to select any one of several different combinations of expression holes in said tracker corresponding with the expression perforations in the particular selected type of note sheet for the control of expression devices in the system appropriate to that note sheet.

7. An expression system for a reproducing piano including, in combination, a tracker having a plurality of expression holes, expression devices, and means operable to connect said expression devices selectively with any one of several predetermined combinations of expression holes.

8. An expression system for a reproducing piano including, in combination, a tracker having a plurality of expression holes, expression devices, and means operable to connect said expression devices selectively with predetermined combinations of expression holes thereby conditioning the system to produce substantially equivalent expression effects with several different types of note sheets.

9. An expression system for a reproducing piano including a tracker having, in combination, a plurality of expression holes, and means to select predetermined combinations of said expression holes corresponding with the expression perforations in several predetermined types of note sheets to control expression devices of the system in accordance with the system of expression perforations in said types of note sheets.

10. An expression system for a reproducing piano including a tracker having, in combination, a plurality of expression holes, expression devices, and manually-controlled means selectively to connect said expression devices operable with any one of several predetermined combinations of expression holes.

11. An expression system for a reproducing piano including, in combination, a tracker having a plurality of expression holes, a plurality of expression devices, and manually-controlled means to select a certain group of expression holes to render active a certain portion only of the expression devices, and to select another group of expression holes to render active a different portion of the expression devices.

12. An expression system for a reproducing piano having means to effect the reproduction of expression indicated by the expression control means of several different types of note sheets the expression control means of which follow different systems for obtaining varieties of expression, said means including, in combination, expression devices, controlling means for said expression devices governed by the expression control means of each of several different types of note sheets, and means to select any one of several combinations of controlling means corresponding with the expression controlling means of the selected type of note sheet for the proper control of said expression devices.

13. A reproducing piano having means to condition it to play several note sheets having different systems of expression perforations, said means including, in combination, an expression system having expression devices, a tracker having a plurality of expression holes adapted to be controlled by the expression perforations in the several note sheets, and means selectively to connect said expression devices operable with the expression holes corresponding to the expression perforations in a selected note sheet.

In testimony whereof, I have signed my name to this specification.

SAMUEL H. PERRON.